US006434211B1

(12) United States Patent
Lloyd et al.

(10) Patent No.: US 6,434,211 B1
(45) Date of Patent: Aug. 13, 2002

(54) TIMING CIRCUIT

(75) Inventors: Christopher J. Lloyd, Longsight; David J. Clarke, Sandbach, both of (GB)

(73) Assignee: The Victoria University of Manchester, Manchester (GB)

( * ) Notice: Subject to any disclaimer, the term of this patent is extended or adjusted under 35 U.S.C. 154(b) by 0 days.

(21) Appl. No.: 09/529,396

(22) PCT Filed: Oct. 16, 1998

(86) PCT No.: PCT/GB98/03093

§ 371 (c)(1),
(2), (4) Date: Jun. 30, 2000

(87) PCT Pub. No.: WO99/21063

PCT Pub. Date: Apr. 29, 1999

(30) Foreign Application Priority Data

Oct. 16, 1997 (GB) .............................................. 9721847
Aug. 1, 1998 (GB) .............................................. 9816703

(51) Int. Cl.[7] .................................................. G01D 1/00
(52) U.S. Cl. ........................................................ 377/20
(58) Field of Search ........................... 377/20, 118, 119, 377/124; 327/141, 142

(56) References Cited

U.S. PATENT DOCUMENTS 3,739,163 A 6/1973 Hirasawa et al. ........... 235/183
4,604,536 A 8/1986 Clutterbuck et al. ........ 377/107
4,802,194 A 1/1989 Nishibe ....................... 377/20
5,689,539 A * 11/1997 Murakami ................... 377/20
5,812,625 A * 9/1998 Potier et al. .................. 377/20
5,982,841 A * 11/1999 Terada et al. ................. 377/20

FOREIGN PATENT DOCUMENTS

| | | |
|---|---|---|
| EP | 9260502 A3 | 3/1988 |
| FR | 2135065 | 12/1972 |
| GB | 947430 | 1/1964 |
| GB | 1195262 | 6/1970 |

OTHER PUBLICATIONS

Fedders: "Ein Schnelles Periodendauermessgeraet mit logarithmischer Frequenzanzeige fuer Sprachuntersuchungen", *Biomedizinische Techinik*, vol. 22, No. 3, Mar. 1977, pp. 3636–3638.

Norris et al, "Nonlinear Timer", *IBM Technical Disclosure Bulletin*, vol. 14, No. 9, Feb. 9, 1972, pp. 2627–2628.

Pasca S S G et al:, "One–Computer Photon–Arrival Timer", *Measurement Science and Technology*, vol. 4, No. 12, Dec. 1, 1993, pp. 1404–1409.

Exponential Delta Timer:, *IBM Technical Disclosure Bulletin*, vol. 33, No. 8, Jan. 1, 1991.

* cited by examiner

*Primary Examiner*—Tuan T. Lam
(74) *Attorney, Agent, or Firm*—Nixon & Vanderhye P.C.

(57) ABSTRACT

A timing circuit records the duration of intervals between a plurality of events in a data stream. The circuit includes at least two timing channels, each arranged to generate a signal representing time elapsed between events. The rate of change of the signal generated by each timing channel varies with increasing interval duration, and the timing channels are arranged such that each event terminates the operation of one timing channel and initiates operation of another timing channel.

55 Claims, 6 Drawing Sheets

TIMING CIRCUIT

BACKGROUND OF THE INVENTION

1. Field of the Invention

This invention relates to a timing circuit for timing a delay between events. The invention is suited to the analysis of arrival times between pairs of events, and the analysis and storage of continuous data streams. The invention is particularly suited to photon correlation spectroscopy measurements, 2. Related Art Analysis of signals that vary in a characteristic manner may be carried out by various methods including: real-time digital electronic correlation, storage of a signal data stream (with later analysis by hardware/software), single stop techniques, multiple stop techniques, gating circuits and Fourier Transform of the signal.

A simple method of analysing a photon stream uses coincidence detection, where two detectors are arranged to detect photons arriving at a predetermined fixed delay (Oliver C. J., 1973, Correlation Techniques, Photon Correlation and Light Beating Spectroscopy, pages 41–74, Ed. Cummins H. Z., Pike E. R., Plenium Press NY, ISBN 0-306-35703-8). This technique allows detection of photons with a bandwidth of the order of 1 GHz (Moreno, F., Gonzalez F., Lopez R. J., Lavin A., 1988, Time-interval statistics through a Lapace transform method in quasi-elastic light-scattering experiments for low-intensity levels, Opt. Soc. Am. Vol. 13, pages 637–639). The delay between detectors and the intensity of a source of the photons must be adjusted such that there is a negligible probability of two photons arriving with a separation less than the delay time between the detectors This method effectively gives a photon correlation value for a single delay time, and requires experiments of long duration. Some improvement in operational speed may be gained by using multiple channels to measure a time interval between pairs of photons, although this will lead to distortion of the correlation.

The distortion introduced by multi-channel single stop measurements can be reduced by using multi-stop techniques, whereby a number of concurrent photons may be detected. Data collection is most effective when a period of recording is initiated by an incident photon Distortion of data is only eliminated when Gaussian sources of light are used.

Multi-stop apparatus conventionally includes time-to-amplitude converters and pulse storage devices which provide very high speed responses but are expensive. Attempts have been made to substitute these components with standard microprocessors. A multi-stop apparatus based on a hardwired computer has been produced which allows 3500 consecutive sample periods to be stored prior to analysis, although at a sampling rate limited to 0.1 MHz (Hallet F. R., Gray A. L., Rybakowski A., Hunt J. L., Stevens J. R., 1972, Photon correlation spectroscopy using a digital PDP-9 computer, Canada J. of Phys., Vol. 50 pages 2368–2372). A later version of this apparatus stored only arrival times using an 8085 processor, and was capable of operation at 1 MHz (Subrahnanyam V. R., Devraj B., Chopra S., 1987, Microprocessor based photon correlator for intensity fluctuation studies, J. Phys. E, Sci. Instrum, Vol 20 pages 340–343).

A significant drawback of multi-stop or non-stop timing circuits when used for high resolution analysis is the magnitude of raw data produced. For example, assuming a signal of $10^4$ events per second and a required resolution of 1 ns, the mean number of clock pulses between events will be $10^5$. Even where events spaced by more than 2000 ns are ignored, the rate of clock cycles per second is $20\times10^6$. In many applications, experimental durations range from 30 seconds to a few minutes, and problems are likely to arise due to the magnitude of data to be stored, and the processing power and/or time required to process results. This limitation is avoided by real-time correlation and pulse arrival distribution analysis techniques.

Correlators do not record the time elapsed between each of a sequence of events, but instead provide a record of the distribution of times separating consecutive events. This is done by defining a number of channels for different separation times, then incrementing a counter located at a relevant channel when an event separated by a given time from a previous event is recorded. Since correlators do not store the sequence of events, a significant reduction of the data to be stored is achieved. A drawback of correlators is that later re-analysis and/or further digital signal processing of the sequence of events is not possible since the sequence itself is not stored.

Where the correlation is measuring a signal that gives a reducing gradient with correlator delay time (i.e. an exponential or mixture of exponentials as is often the case in light scattering) it is common to space the correlator channels in a logarithmic or similar fashion (each channel spacing being double the last is often a convenient implementation in electronics). The data points at longer delay times generally exhibit greater relative errors and are given less weighting in the final fit, although all data points are measured with equal resolution prior to being transferred to a channel.

Real-time electronic digital correlators suffer from significant disadvantages. All parts of the circuitry of a correlator must operate at the shortest correlator delay time, since no data compression occurs on the data stream. This generally makes high speed correlation expensive, and practical limitations suggest hardwired electronic correlators operating above 50 MHz are not economically feasible for most applications.

On initialisation the correlator must load a sample of data equivalent to the number of channels prior to reseting the accumulators (effectively discarding this information) to operate with minimum bias/error. This is a limitation on correlator speed (to allow resetting the accumulators during a single sample time), as well as final correlator length and/or minimum experiment duration. Where the accumulator is not reset in a single sample time after prefilling significant errors or bias may be introduce particularly for short experiments and/or correlators with many channels.

A burst correlator is capable of allowing only pulse arrivals within a limited number of delay times to be detected per experiment, the number of delay times being determined by the number of channels available. This simplified arrangement allows fast correlators to be produced which operate at speeds of around 100 MHz. Whilst burst correlators operate almost in real time, an average of many results is required to carry out a reasonably accurate measurement. Burst correlators allow for rapid decays to be measured, although still requiring costly hardware, and their speed of operation is fundamentally limited by the time required for multiplication/addition processes to be performed.

Burst correlators may suffer significantly from the prefill error discussed above. Burst correlation is highly inefficient in terms of data collection as data must be read out and the correlator reset after a number of sample periods equivalent to the number of channels that have been collected.

A correlator based upon parallel processing using standard transputer boards has been developed (Bruge, Biagio, Fomrnili, 1989, New photon correlator design based on transputer array concurrency, Rev Sci Instrum, Vol. 60, No. 11, page 3425), which has similar operating characteristics to specialised hardwired commercial equipment Real-time electronic correlation is however still limited in terms of speed and cost.

SUMMARY OF THE INVENTION

It is an object of the present invention to overcome or substantially mitigate the above disadvantages, and thereby provide an apparatus capable of timing intervals between pulses in an efficient mariner.

According to the invention there is provided a timing circuit for recording the duration of intervals between a plurality of events in a data stream, comprising at least two timing channels, each arranged to generate a signal representing time elapsed between events, wherein the rate of change of the signal generated by each timing channel varies with increasing interval duration, and the timing channels are arranged such that each event terminates the operation of one timing channel and initiates operation of another timing channel.

In many instances it will be preferable that the timing circuit is configured such that the rate of increase of the signal changes as a predetermined series, particularly as a substantially geometric series, although other distributions may be beneficial for other applications. The term 'substantially geometric series' is intended to include instances where an electronic circuit generates a sequence which is almost geometric. An alternative distribution may be provided via a pre-programmed sequence that is not a single simple mathematical function.

At least one of the timing channels may comprise a source of clock pulses and a counter, the signal comprising the clock pulses which are accumulated by the counter between events.

Preferably, the rate of increase of the accumulated count is determined by an internal counter and a logic circuit, the logic circuit being programmed by the internal counter to cause an increment of the accumulated count when a predetermined number of cycles of a linear clock have occurred.

At least one of the timing channels may be an analogue clock.

The analogue clock preferably comprises a charge component which is charged or discharged between events, the charge component exhibiting an intrinsic non-linear complex impedance.

Preferably, the timing circuit further comprises an analogue to digital converter for converting an analogue signal at the charge component into a digital signal and means for resetting the charge at said charge component upon the arrival of an event.

Preferably, the charge component is an electronic component, which provides an output to a comparator comprising a voltage across or a charge accumulated in the charge component.

Charging or discharging of the charge component may be commenced from a non-zero initial value, the initial value being chosen to provide a required rate of change of charging or discharging.

The complex impedance may be selected by switching between combinations of charge components.

Preferably, the charge component is a substantially capacitive circuit.

Charging or discharging of the charge component may be induced by optical excitation.

The charge component may comprise one or more solid sate optical detectors which provide a nonlinearity function, via overfilling of the one or more detectors.

Preferably, the timing circuit comprises a plurality of timing channels arranged to operate in a predetermined sequence, each event terminating the operation of one channel and initiating the operation of the next channel in the sequence.

Preferably, the circuit is configured such that a detected event will cause the contents of the channel the operation of which is to be is terminated to be transferred to a storage circuit, whilst initiating the generation of a timing signal by the next channel. This arrangement reduces the effect of the 'deadtime' during which a channel is reset.

Storage means may be provided for recording time delays between successive events, the stage means comprising a first store and a second store, data being collected in the first store prior to being transferred to the second store. This arrangement is advantageous when the readout rate of a stored pulse stream is slow compared to the rate of events which are to be recorded, since the contents of a channel may be transferred quickly to the first store, thereby allowing that channel to be reset and restarted quickly. The data may then be transferred to the second store after the channel bas been restarted. The first and second storage means are also useful if further signal processing is required that cannot occur at the rate of events, since data may be held in the first store and then transferred to the second store via any required signal processing apparatus.

The second storage circuit may be a first-in-first-out buffer storage circuit.

The circuit may comprise two detectors for detecting events in the data stream, the detectors being arranged such that an event incident at a fit detector will terminate the operation of a first timing channel and initiate the operation of a second timing channel, and a subsequent event incident at a second detector will terminate the operation of the second timing channel and initiate the operation of the first timing channel or a third timing channel.

The two detectors for detecting events in the data stream, may have different characteristic noise signatures such that cross-correlation of the detectors produces a characteristic noise signature significantly below that of the auto-correlation of either detector.

The two detectors may be based upon different physical detection phenomena, such that any similarity in the characteristic noise signatures of the detectors is minimised. The two detectors preferably comprise a photon multiplier tube and a solid state detector. The solid state detector may for example be an avalanche photodiode or a PIN diode.

Preferably, a temperature of the solid state detector may be modified independently of the temperature of the photon multiplier tube, to modify the characteristic noise signature of the solid state detector, and thereby enhance the difference between the characteristic noise signature of the solid state detector and the characteristic noise signature of the photon multiplier tube.

Preferably, the circuit is provided with means for obtaining a measurement comprising a correlation of an excitation signal distribution with a distribution of detected events induced from a sample by the excitation. The correlation is preferably carried out in real-time. The circuit may also be provided with means for generating pulse arrival distributions, Fourier transforms or providing digital filtering.

Preferably, the events whose separation are measured by the timing circuit are photons which are detected by a suitable detector means. The detected photons may be from a single source or multiple sources.

Where events to be timed are not represented by single bits (1 or 0), the timing circuit may be implemented in conjunction with a comparator, to determine a detected event.

Where events to be timed are not represented by single bits (1 or 0), the timing circuit may be implemented in conjunction with an analogue to digital converter circuit, allowing attributes of an event to be stored in conjunction with the timing of the event (for example, pulse height).

The circuit may be configured to measure the time duration of pulses, an initial portion of a rising edge of a pulse being treated as a first event, and a final portion of a falling edge of the pulse being treated as a second event.

Where the pulse width as opposed to pulse arrival time is required to be measured, the timing circuit may be wired directly to measure pulse width, or in the alternative, the signal may be inverted. Preferably an inversion circuit would be an integral part of the tinning circuit, thereby allowing rapid changeover between measurement of pulse withstand measurement of pulse arrival times Where information is contained in another characteristic of a pulse such as height, area or gradient, conversion of the characteristic to a pulse width will allow the characteristic to be measured by the timing circuit.

The circuit may be configured to measure the number of events occurring within a specific time rather than the elapsed time between events.

A trigger from an external source may be arranged to initiate operation of the circuit. Alternatively, a trigger from an external source may be arranged to enable, although not initiate, operation of the circuit.

At least one of the ting channels may comprise a linear clock connected via an internal counter to an input of a multiplexer, the multiplexer having outputs connected to a series of accumulators only one of which is incremented as a result of a monitored interval, the interval time required to cause incrementation of a second accumulator of any successive pair of accumulators being greater than the interval required to cause incrementation of the first accumulator of the pair. The internal counter may comprise a cascade of counters.

The circuit may be configured such that an event comprises the accumulation of charge from a detector until the charge is greater than a predetermined level, whereupon the operation of one timing channel is terminated and the operation of another timing channel is initiated. In this arrangement a signal incident on the detector may be analogue or digital.

The timing circuit described may be operated with a resolution of the order of nanoseconds using conventional electronic circuits. It is noted mediums other than electronics, such as light, could be used to produce a faster timing circuit.

It is noted that for correlation of optical signals it would be preferable to use the optical (as opposed to electronic) medium for logical operations. This would remove the need for a detector and allow further integration.

A real-time display may be used to represent an event time separation distribution during measurement of said event time separations.

The initialisation bias common to conventional correlators will at most be limited to the first stored delay (which may be removed when pulse storage occurs) as there is no requirement for prefill, as is the case in correlation.

In some applications, for example pulsed fluorescence detection, a trigger may be linked to a source, which will allow the timing circuit to operate only at specific selected times in relation to the configuration of a fluorescence source.

In some applications it may be preferable to initiate operation of the timing circuit using a signal which is different to that which is to be counted.

A pre-set delay or until a separate external retrigger may be used to delay a reset of the timing circuit after the storage means is filled.

It is noted that the timing circuit could be adapted (or fitted with a suitable multiplexer) to allow non-linear counting of the number of events occurring within a fixed time period.

There are two distinct implementations of the invention, that where a data stream representing the separation of a series of events is measured and is stored, and that where the pulse arrival distribution is stored (i.e. equivilent to a correlator). In the latter case the actual timing may be done in a linear manner by a counter and converted to a non-linear form by only storing the most significant bit of the number representing the arrival time of the pulse.

The counter may be a single electronic counting device or a cascade of counting devices.

The invention may be implemented entirely or partially as a computer program, such that a computer is configured to carry out the invention. A program of this type may be implemented as software or hardware. Where at least part of the invention is implemented in hardware, this may include an optical component.

BRIEF DESCRIPTION OF THE DRAWINGS

Specific embodiments of the invention will now be described with reference to the accompanying drawings, in which.

DETAILED DESCRIPTION OF EXEMPLARY EMBODIMENTS

Figure 1:
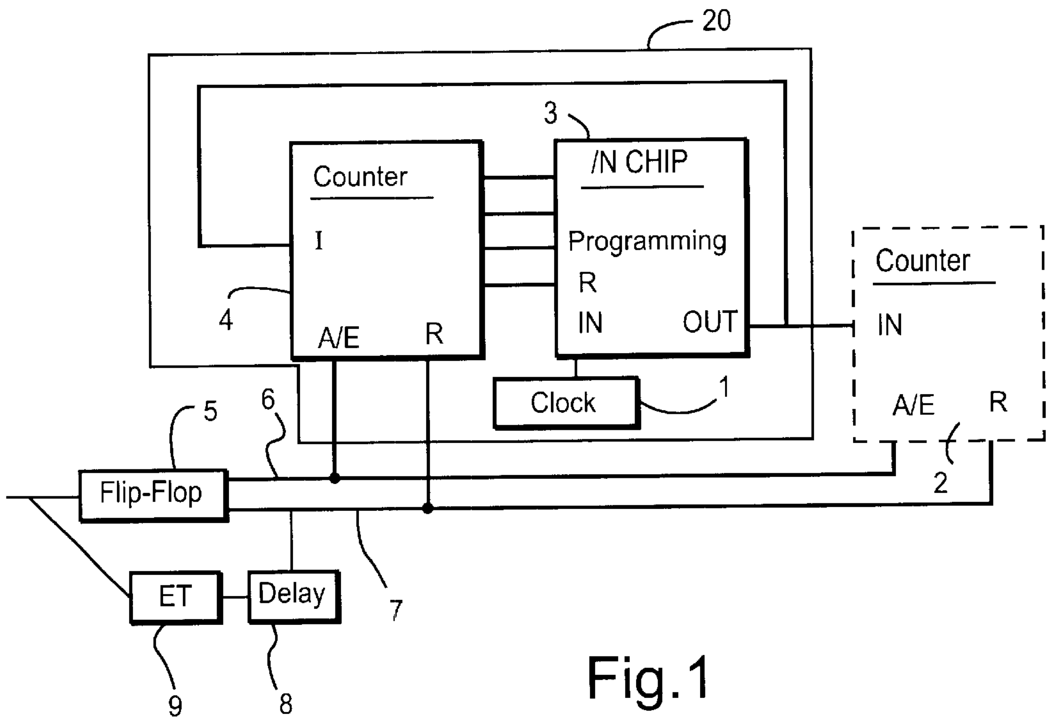
FIG. 1 is a schematic representation of a channel of a timing circuit according to a fist embodiment of the invention.

FIG. 1 shows a channel of a timing circuit suitable for use in conjunction with storage of a data stream comprising a series of events separated by a variable delay.

In FIG. 1, a channel of a timing circuit comprises a clock 1, an output counter 2, a 'divide-by-N' chip 3, a clock counter 4 and a flip-flop circuit 5. The clock 1 cycles continually at a predetermined rate. The divide-by-N chip produces a single output pulse in response to multiples of pulses produced by the clock 1. The number of clock pulses required to induce an output pulse from the divide-by-N chip 3 increments as the geometric series 1,2,4,8,16,32 . . . with each output pulse from the chip 3. The function of the clock counter 4 is to increment number of clock pulses required by the divide-by-N chip 3 before it will produce an output pulse. The clock counter 4 may be thought of as providing a denominator value for a fraction recorded in the divide-by-N chip 3, the chip 3 recording a numerator value corresponding to the number of clock pulses produced by the clock 1. An output from the divide-by-N chip 3 is produced each time the numerator and denominator are equal.

An event at an input to the flip-flop will cause it to change states, for example a first output 6 of the flip-flop 5 will go high and a second output 7 will go low. This allows the output counter 2 and the clock counter 4 to begin counting pulses from the clock. Since the divide-by-N chip 3 has been reset, the first pulse from the clock 1 is effectively divided by one. The divide-by-N chip 3 produces an output pulse which causes incrementation of both the output counter 2 and the clock counter 4.

Following the first incrementation of the divide-by-N chip 3, the clock counter 4 programs a denominator value of two into the divide-by-N chip 3. Two cycles of the clock 1 are needed to induce an output from the divide-by-N chip 3, which is recorded as a second pulse by the output counter 2 and the clock counter 4. Following the second incrementation of the divide-by-N chip 3, the clock counter programs a denominator value of four into the divide-by-N chip 3. In this way, each incrementation of the output counter 2 represents an elapsed time which is double the time elapsed between previous incrementations.

A subsequent event at the input to the flip-flop 5 will cause the first output 6 to go low and the second output 7 to go high. The contents of the output counter 2 will be transferred into some means of storage, for example a computer memory, and the output counter 2 and clock counter 4 are then reset. A delay circuit 8 which is triggered by an edge detection circuit 9 disables the counters 2, 4 until they have been reset, whereupon the measurement process begins again.

If the cycle rate of the clock 1 is high, there will be insufficient time between clock cycles for the clock counter 4 to reset the divide-by-N chip 3. When this is the case, an initial clock cycle following a reset will not be recorded by the circuit. This limitation may be overcome by providing a divide-by-N chip 3 arranged to operate to a different timing pattern, for example 2,3,5,9,17 . . .

It should be noted that detected events are not themselves counted but act as the start and stop pulses for counters which accumulate a signal based on the clock 1.

The described circuit is particularly suited to photon correlation, since sequences such as 1,2,4,8,16,64 are often used for baseline measurements with a minimum number of channels.

Figure 2:
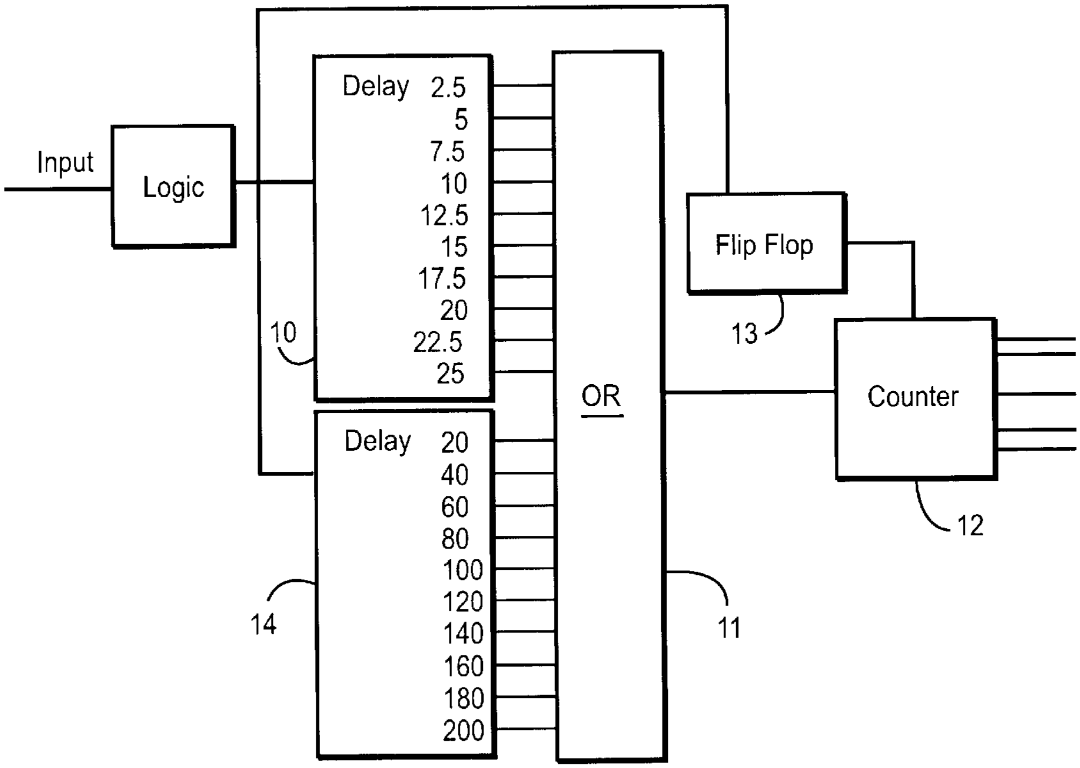
FIG. 2 is a schematic representation of a channel of a timing circuit according to a second embodiment of the invention.

FIG. 2 illustrates an alternative embodiment of a channel of a timing circuit according to the invention. The circuit comprises a chip provided with a bank of delay lines 10, each of which is connected via an OR logic gate 11 to a counter 12. An event at an input to the circuit will be input to each of the delay lines. A first of the delay lines will transmit a pulse to the OR gate after a delay of 2.5 (arbitrary units), inducing an incrementation of the counter 12. A second delay line will transmit a pulse to the OR gate after a delay of 5.0 (arbitrary units), causing a second incrementation of the counter 12, a third incrementation occurring after a delay of 7.5, and so on. A subsequent event at the input to the circuit will modify the state of a flip-flop 13, which will disable subsequent incrementation of the counter 12. The contents of the counter 12 are then transferred to a storage device.

A second chip with a second bank of delay lines 14 shown in FIG. 2 may be used to provide an alternative set of delay times, by disabling the input connected to the first bank of delay lines 10 and enabling an input to the second bank 14. This allows the resolution of the channel to be changed.

A limitation of the illustrated channel embodiment is that the banks of delay lines 10, 14 will continue to function after the counter 12 has been disabled. This means that the circuit will only be reset once the delay lines 10, 14 have cycled through every delay value. This problem could be overcome by introducing a reset function into the delay lines, either directly or by disconnecting power from the entire circuit. Alternatively, a large number of banks of delay lines each with the same set of delays could be arranged such that each input event initiates operation of a new bank.

Although the banks of delay lines 10, 14 contain delay lines arranged in a linear sequence, it is a simple matter to substitute them with a non-linear sequence of delay lines.

Figure 3:
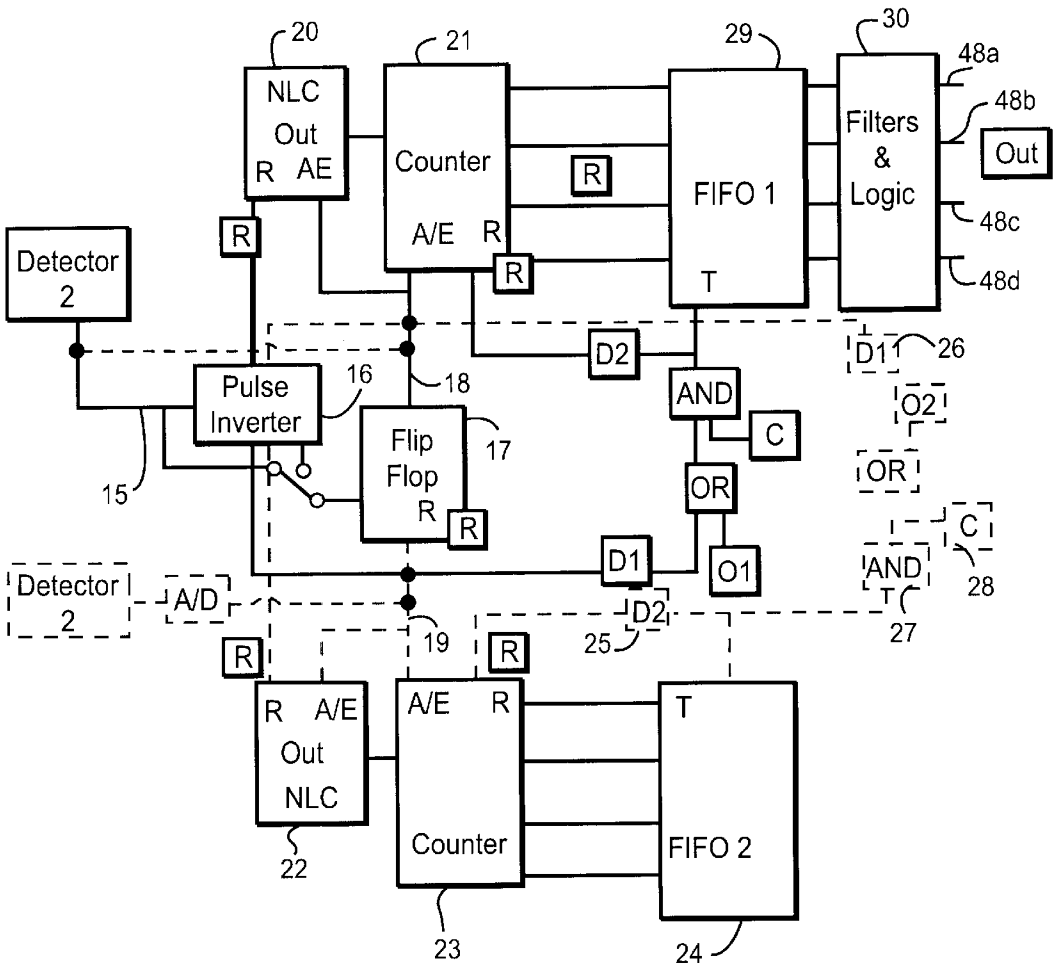
FIG. 3 is a schematic representation of a timing circuit according to the invention.

FIG. 3 shows a two-channel storage circuit according to the invention. Solid lines in FIG. 3 indicate a first channel of the circuit, and dotted lines indicate a second channel of the circuit. The circuit illustrated in FIG. 3 will be described in terms of its operation.

An event detected by detection electronics (not shown) will cause a signal to be transmitted to an input 15 of the circuit. The signal may be inverts by a NOT gate 16 or other circuit. The input signal will modify the configuration of a flip-flop circuit, which in the example illustrated in FIG. 3 will cause a first output 18 of the flip-flop 17 to go high, and a second output 19 of the flip-flop 17 to go low.

When the first output 18 of the flip-flop 17 is high, a first non-linear clock 20 (for example, as described in relation to FIGS. 1 and 2) begins to generate clock pulses. The clock pulses are accumulated by a first counter 21.

Simultaneous with the first non-linear clock 20 commencing the generation of clock cycles, a second non-linear clock 22 ceases counting and is reset. A value stored in a second counter 23, which corresponds to the number of clock pulses emitted by the second clock 22 is read into a First-In-First-Out circuit 24 (FIFO), from which it is read into a computer memory. A delay circuit 25 ensures that the second counter 23 has stabilised before its contents are transferred to the FIFO 24. A further delay circuit 26 may be used to ensure that the FIFO 24 does not attempt to transfer data to the computer memory until a predetermined time has elapsed since the previous transfer from the FIFO 24, or a signal is received from the computer indicating that it is ready to receive data. An alternative method of providing a delay between data transfers from the FIFO 24 is using an AND gate 27 connected to a suitable clock 28.

The FIFO 24 is reset after it has read the contents of the second counter 23. A delay (not shown) may be incorporated into the reset to ensure that the FIFO 24 has stabilised before it is reset.

Detection of a subsequent event by the detection electronics (not shown) will produce a second input signal, which signal will cause the second non-linear clock 22 and the second counter 23 to be enabled, whilst the first non-linear clock 20 is disabled and the contents of the first counter 21 are transferred to a first FIFO 29 and on to the computer memory.

On readout the FIFO's 24, 29 may pass data to suitable digital logic filters or other circuits 30, prior to transferral of the data into the computer memory.

It will be appreciated that the use of two channels, each with a separate non-linear clock 20, 22 will allow the measurement of very short time delays between two adjacent events. If only a single clock was used, the delay required to read the contents of a counter and reset it to zero would be a 'dead time' during which no detection of events could take place. In contrast, by using two channels, the resolvable time delay between two adjacent events is limited by the response time of the detector (not shown) and the switching speed of the flip-flop 17 between outputs 18, 19. The bandwidth of the detection electronics (not shown) may be set to be equal to the switching speed of the flip-flop 17 to ensure that two events cannot be detected during a time period faster than the resolution of the storage circuit.

The apparatus is limited in that a third event arriving very quickly after the two adjacent events will not be detected, since neither channel will have been reconfigured. More channels may be added to the circuit of FIG. 3 to allow detection of a closely spaced series of three or more events. If only two channels are used, a timed add-enable (not shown) may be introduced on the flip-flop 17 to ensure that a third event does not cause switching of the flip-flop 17 before a channel is reset and ready to record an event. The add-enable could be activated by a delay and latch from the flip-flop 17 to a last channel 18, 19. Where the memory buffer is considerably lower than the operation of the circuit, than the output to the buffer from each channel could also be multiplexed into a plurality of parallel buffers.

It is noted that in many situations the pulse arrival distribution may be modelled Poisson, Bose-Einstein or similar well understood models. Whilst it may be important that any two photons may be distinguished with a high time resolution the probability of multiple photons in a short delay decreases significantly with photon number. Thus a system that is capable of resolving two photons with a resolution of N but having a dead time of (for example) 10N prior to the third photon may be of significant use.

The invention is particularly suited to the measurement of sparse data. When the mean arrival rate of data to be detected by detection equipment is less than a tenth of the sampling rate of the detection equipment the data is said to be sparse. In many instances the difference between the sampling rate and the data arrival rate may be many orders of magnitude. Sparse data is conventionally difficult to store and/or analyse as the vast majority of the data contains little or no information (i.e. the signal may be 99.99% zeros) and conventional storage of such data is particularly uneconomic.

The timing circuit according to the invention is provided with two, three, four or more channels, depending upon the distribution of the data to be detected. For example, where the probability of two photons arriving within a channel reset period is small and the probability of three photons arriving within a channel reset period is vanishingly small, then a timing circuit according to the invention having two channels is required. If the probability of three photons arriving within a channel reset time is significant, then a timing circuit according to the invention with three channels should be used, and so on.

It should be noted that no loss in performance results from the use of a timing circuit having more than the necessary number of channels. For example, where a timing circuit having two channels is required, a timing circuit having four channels will function equally well. The only disadvantage incurred is the extra complexity and hence extra cost of the four channel circuit over the two channel circuit.

Since the invention provides non-linear timing of events, the size of the numbers generated during measurement is minimal. This is particularly advantageous when the invention is used to detect events having a sparse data distribution, since the time elapsed between events may be very long and, if a linear clock was used this would result in the generation of very large numbers, which would be detrimental to the speed of measurement. For example, the timing circuit shown in FIG. 3 has two FIFO's 24, 29 from which data is transferred to a memory each time a timing channel is reset. The channel reset time is to a large extent determined by the time required to read data from and reset the FIFO's 24, 29. If a linear clock were to be used then the time needed to transfer the resulting very large numbs from the FIFO's 24, 29 to the memory would be considerable, and the channel reset time would be correspondingly large. The use of the non-linear clock arrangement thus allows the channel reset time be kept to a minimum, thereby maximising the resolution of the timing circuit.

When measure event distributions (or pulse widths) that always have a minimum spacing (ie. hey vary between X and Y, and X is never zero), a delay line of value X may be incorporated into the flip-flop 17 of the embodiment shown in FIG. 3, to ensure that the relevant clock 20, 22 and counter 21, 23 are active only after time X has elapsed. This ensures that only signals containing information are measured, thereby increasing the range of the storage circuit.

It is noted hat a storage device could be connected directly after the counters 21, 23, but that data compression would not occur since each event separation time would still be required to be represented by a binary number of predetermined length. A look-up-table circuit (as illustrated in table 1 below) may be used to reduce the number of bits required to represent the binary number prior to storage in a computer memory.

Loss of information in the timing circuit of FIG. 3 occurs only at longer pulse arrival times. In many applications the final data points these generate (the long decay times in correlation) are given less weight during analysis since these have a more significant error when expressed as a percentage of their magnitude. Furthermore, in many cases the rate of change of the correlation line shape decreases at longer time scales so that data representing long delays between events also contains less information.

The circuit described in relation to FIG. 3 may be adapted for operation at frequencies that would normally be excluded due to a finite pulse width of the detector electronics output (this may only be achieved when the speed of the clocks 20, 22 is significantly faster than the pulse width of the detector electronics).

The detector electronics is modified such that an event will be incident on one of two detectors. The flip-flop 17 is removed from the circuit. A leading edge of an output from the first detector in response to an incident event is made to start the first counter 21 whilst stopping and reading the second counter 23. A subsequent event incident at the second detector will generate an output from that detector, a leading edge of which is arranged to stop the first counter 21, read out that counter, and start the second counter 23. Thus a signal corresponding to an event at the first detector initiates counting which is stopped by a signal corresponding to a subsequent event at the second detector. The minimum resolvable time between these two events is a function of only the jitter times of the detectors and not the pulse widths of the detectors. It is noted however that the minimum time between three or more events remains a function of the pulse width of the detectors outputs.

Following an event incident at the first detector, the circuit will continue to measure elapsed time until an event is incident at the second detector. An intermediate event incident at the first detector during this time will have no effect. Thus, on average the number of events timed by the circuit is reduced by 50%. However, this may be seen as an advantage of the invention since it reduces the effect of detector afterpulsing, that is a false signal generated by a detector a characteristic time after detection of an incident event (afterpulsing is particularly the prevalent in photon detectors).

It is noted that solid state detectors suffer afterpulsing due to 'traps', caused by impurities and surface defects whereas photon multiplier tubes (PMT) suffer afterpulsing due to the ionisation of contaminants. The underlying principles of afterpulse generation in these two types of detectors are thus based on different physical phenomena, and as such their characteristic afterpulse signature are different. Where two detectors of one type are used, a correlation (or other combination) of signals detected by the two detectors will include an artifact caused by afterpulsing. This artifact may cause significant distortion of the correlation. In contrast to this, where two types of detectors are used, a correlation of signals will include random noise caused by afterpulsing at each detector. The random noise will not have a significant effect on the correlation, and distortion of the correlation is avoided.

Afterpulsing in a solid state detector may be reduced in magnitude and increased in time-scale by cooling. The signature of a PMT and the signature of a solid state detector, for example an avalanche photodiode, may thus be designed to be radically different via control of the temperature of the avalanche photodiode, The use of a detector comprising a PMT and a photodiode thus allows the elimination of afterpulse effects, and suppression of other noise which is not the result of an incident event arriving at a split detector.

A co-operating detector as described above may be used in any suitable application, and parameters other than temperature may be used to increase the difference between the characteristic noise signature of the detectors.

Where two or more parallel data buffers are present per detector a simple switch would allow the circuit to operation to change from an arrangement which minimises afterpulses and maximises time resolution, to an arrangement capable of measuring two signals entirely independently.

Figure 4:
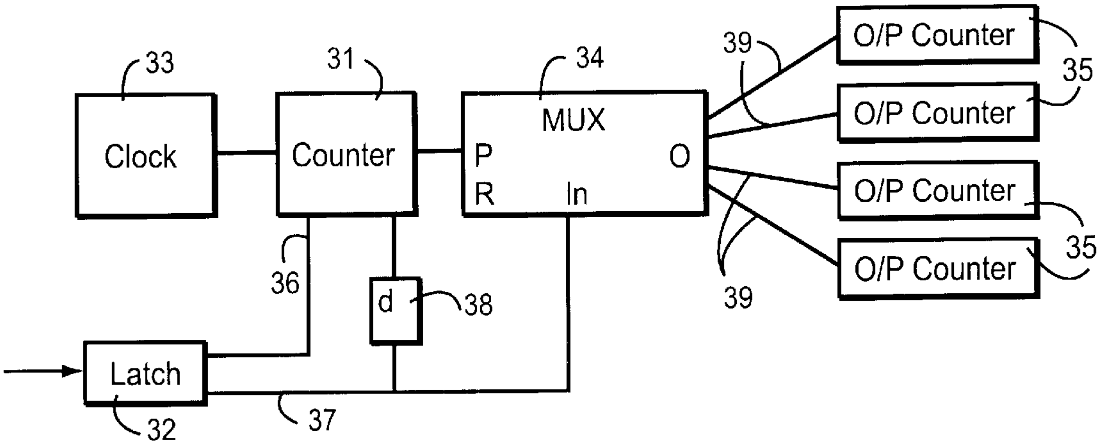
FIG. 4 is a schematic representation of a channel of a timing circuit according to a third embodiment of the invention.

FIG. 4 shows a channel of a timing circuit incorporating a multiplexer. The channel comprises a counter 31 connected to a latch 32 and a clock 33, and via a series of output lines (not shown) to a multiplexer 34 which is connected to a series of output counters 35.

An event arriving at an input to the latch 32 will send a first output 36 of the latch 32 high, enabling the counter 31 to start accumulating clock pulses from the clock 33. A subsequent event will send a second output 37 of the latch 32 high, arresting the incrementation of the counter 31 and causing the multiplexer 34 to increment the contents of an output counter 35. After a suitable delay, determined by a delay circuit 38, the counter 31 is reset.

The operation of the multiplexer 34 is determined by the manner in which it is connected to the output lines from the counter 31. For example, the output lines could be arranged such that the multiplexer 34 will increment an output counter 35 in response to only the most significant bit of a number stored in the counter 31. This may be done by connecting a first multiplexer output line to a first output counter, a second and third output line to a second output counter, a fourth, fifth, six and seventh output line to a third output counter, etc.

For the above described arrangement of the multiplexer 34, the first output counter will only receive a signal when two events are spaced by single clock pulse, and not for 1,3,5,7,etc. clock pulses, as is the case for ordinary binary counting. Thus, the first output counter is not required to accumulate large numbers, and will not saturate rapidly.

It is noted that the data compression is most effective for the counters measuring the fastest events. These counters are required to operate at high speed, and are consequently expensive. The data compression reduces the number of events to be stored by the high speed counters.

The circuit illustrated in FIG. 4 is suitable for use in conjunction with the storage of time distributions between events.

Figure 5:
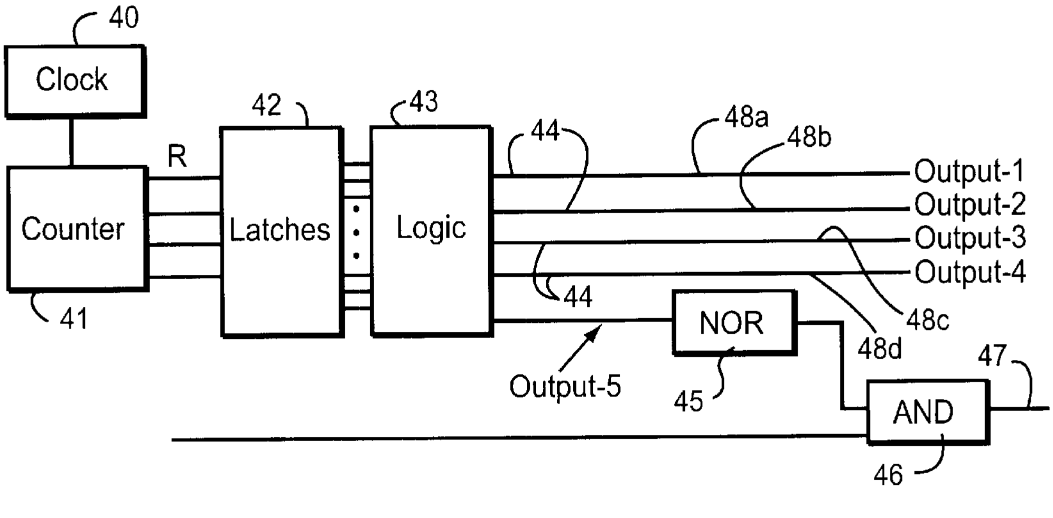
FIG. 5 is a schematic representation of a channel of a timing circuit according to a fourth embodiment of the invention.

FIG. 5 shows a channel of a timing circuit which may be used to compress an event arrival distribution to most significant bit coding using simple latches and NOT logic gates. The channel has a clock 40 which programs a linear counter 41 connected to a series of latches 42. Numbers from the counter 41 are transferred to the latches 42 in binary form, ad an output from the counter representing the linear sequence 1, 2, 3, 4, 5, 6, 7, 8, 9 will be held by the output lines of the latches 42 as 1, 3, 3, 7, 7, 7, 7, 15, 15, 15, 15 (ie. output line of the most significant bit).

A logic chip 43 is connected to the output lines of the latches 42, such that four outputs 44 of the logic chip 43 are incremented in response to the output lines of the latches 42 as follows:

Output 1={1}NOT {2}

Output 2={2}NOT {4}

Output 3={4}NOT {8}

Output 4={8}NOT {Output 5}

Output 5=discussed below

Output 5 will be high for an output of 0000 from the counter 41 and low for all other outputs. Output 5 is connected, via NOR 45 gate to a first input to an AND 46 gate. The second input to the AND 46 gate is a delayed connection from a trigger flip-flop (not shown). An output 47 from the AND gate is thus prevented from going high within a single clock pulse.

A cascade of smaller counters (not shown) connected in serial would provide an equivalent to the counter 41. The cascade would be arranged such that a second counter measured the number of times the most significant bit had occurred on a first counter. Only the fit counter would be required to operate at the maximum clock rate, the second counter would be required to operate at a rate of:

$$\frac{ClockFrequency}{\text{Number\_of\_bits\_First\_Counter}}$$

The cascade of counters may either be arranged to roll over, or alternatively the sequence 1111 could be used as reset, and the reset time added to the most significant bit when considering the data.

Many counter circuits are available which may be cascaded directly. Where this is not practical due to the use of different types/speeds of counters, a flip-flop on the (most significant bit) output connected to a subsequent counter would generate a similar effect Allowing more than one flip-flop to operate between the counters would allow further dilation between the pulse spacing—using the same counter output pins.

The channel illustrated in FIG. 5 is suitable for use in conjunction with the storage of a data stream representing a series of events separated by a variable delay.

Figure 6:
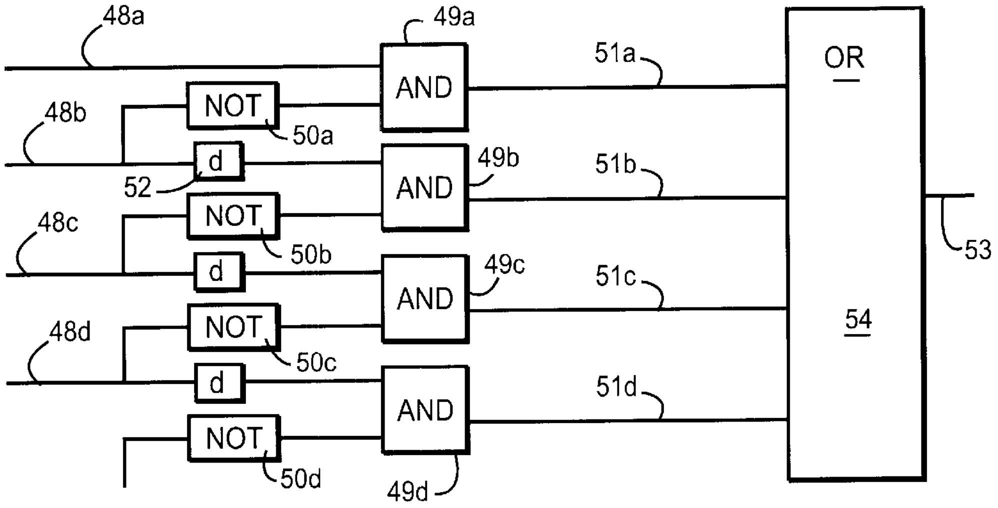
FIG. 6 is a schematic representation of a channel of a timing circuit according to a fifth embodiment the invention.

FIG. 6 shows a channel of a timing circuit which allows for conversion of a most significant bit coding to a non-linear pulse train suitable for pulse stream storage. This allows real-time pulse arrival distribution information as well as non-linear pulse stream storage.

Output lines from a series of latches or a linear counter, as discussed in relation to FIG. 5, are connected as inputs 48*a–d* to an array of logic gates. A first input 48*a* is connected to an AND gate 49, and a second input is connected via a NOT gate 50 to the same AND gate 49. When the first input 48*a* goes high, the second input 48*b* will be low, and an output 51 of the AND gate 49 will be high When the second input 48*b* goes high, the output 51 from the AND gate 49 will immediately go low.

The second input 48*b* is connected via a delay circuit 52 to a second AND gate 53. When the second input 48*b* goes high, an output 54 tom the second AND gate will go high following a delay imposed by the delay circuit 52. The output 54 from the second AND gate will remain high until a third input 48*c* goes high.

The delay circuits 48 operate to give a period when no output Line is high. The logic gates thus convert a series of high inputs 48*a*, 48*b*, 48*c*, 48*d* into a series of pulses on output lines 51*a*, 51*b*, 51*c*, 51*d*. The output lines 51*a–d* are combined into a single output line 53 using an OR gate 54.

The widths of the pulses produced by the circuit will increase with time if the inputs 48*a–d* are connected to outputs of the circuit shown in FIG. 5. A self resetting flip-flop (not shown) may be used to set the pulse durations to a constant value.

The channel illustrated in FIG. 6 is suitable for use in conjunction with the storage of a data stream representing a series of events separated by a variable delay.

In each of the circuits described above in relation to FIGS. 1 to 6, a linear clock used by the invention may be adjusted to allow a required temporal resolution to be chosen via the pulse frequency of the clock.

The above embodiments of the invention are all digital circuits. However, it will be apparent that analogue circuits equivalent to the digital circuits may be constructed. In particular, where digital clock and counter combinations operating in a non-linear manner are described, for example with the counter incrementing as a geometric series with respect to pulses generated by the clock, an analogue component could be used to provide a voltage which increases at a geometrically decreasing rate.

A simple implementation of an analogue non-linear clock may be provided using a capacitor or a combination of capacitors and other components. The intrinsic non-linearity of charge build up of a capacitor provides a voltage which increases at a decreasing rate and is therefore particularly suited to non-linear timing circuits. The use of a capacitor in a non-linear timing circuit has the additional benefit that the circuit has no upper limit which might cause a circuit to become unstable or stop incrementing (as may occur in some digital circuits). The use of a capacitor to provide a non-linear analogue timer has the further advantages that it may be used to provide ultra high speed timing, and has a very low cost.

To reset a capacitor in a timing circuit the capacitor is simply grounded. Alternatively, the capacitor may be connected to some intermediate value, allowing a selected area of the charge cure of the capacitor to be used. It is also possible to reset a capacitor timing circuit by connecting it to a high voltage, the decay of charge on the capacitor may then be used to provide time measurement.

Although the capacitor is a particularly useful component to provide analogue non-linear time measurement, any other component or circuit exhibiting a complex impedance (where 'complex' denotes imaginary numbers) may be used. Capacitors are advantageous in that they may be easily provided on semiconductor chips.

The value of an active component used to provide analogue time measurement may be varied by simply switching between active components of different values, or converting further components in parallel or series to a base component.

Where a analogue timing circuit is used it may be beneficial to have a digital clock or clocks which can be directed at a circuit input to calibrate the circuit at regular intervals, or automatically prior to an experiment or experiments.

Figure 7:
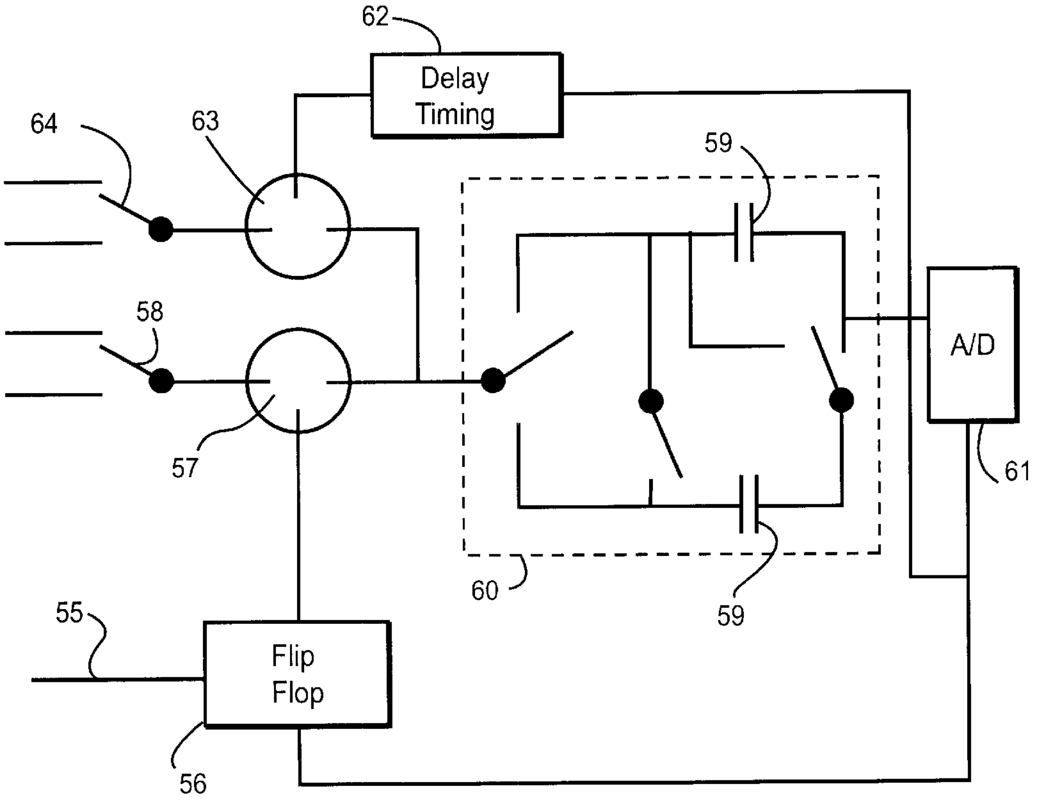
FIG. 7 is a schematic representation of a channel of a timing circuit according to a sixth embodiment the invention.

FIG. 7 shows a channel of a timing circuit according to the invention, with analogue components. The channel shown in FIG. 7 corresponds to the digital circuit shown in FIG. 1.

During operation a pulse on an input line 55 causes a flip-flop 56 to change position and thus switch transistor 57. This allows correction between charging voltages selected using a switch 58 and a combination of capacitors 59. The capacitors 59 are connected via switches shown within a schematic box 60, and may be arranged to operate individually, in series, or in parallel. A subsequent pulse on the input line 55 causes the flip-flop 56 to change position again, the transistor 57 stops the capacitors 59 charging and an analogue to digital converter 61 reads out a voltage across the capacitor circuit shown in schematic box 60. Following a delay induced by a delay circuit 62, a second transistor 63 is switched. Where the transistor 63 is connected via a switch 64 to zero volts, the voltage across the capacitors within the schematic box 60 is set to zero. The switch 64 may be used to set the voltage across the capacitors 59 to a different value.

Table 1 below shows data compression and coding for a non linear clock using binary representation. The new coding itself applies only to circuits using storage. When the pulse distribution is measured, a 15 bit binary number requires 15 counters. However, the data compression occurs on the magnitudes of the values held in the lower counters RH column

TABLE 1

| CLOCK PULSES | BINARY | NEW CODE | BITs reqd to rep Binary | Compression RAM | MSB comp |
|---|---|---|---|---|---|
| 1 | 1 | 1 | 1 | 1 | 1 |
| 2 | 10 | 10 | 2 | 1 | 1 |
| 3 | 11 | 10 | 2 | 1 | 2 |
| 4 | 100 | 11 | 3 | 1.5 | 1 |
| 5 | 101 | 11 | 3 | 1.5 | 2 |
| 6 | 110 | 11 | 3 | 1.5 | 2 |
| 7 | 111 | 11 | | 1.5 | 3 |
| 8 | 1000 | 100 | 4 | 1.33 | 1 |
| 9 | 1001 | 100 | 4 | 1.33 | 2 |
| 10 | 1010 | 100 | 4 | 1.33 | 2 |
| 16 | 10000 | 101 | 5 | 1.66 | |
| 32 | 100000 | 110 | 6 | 2 | |
| 63 | 111111 | 110 | | 2 | 6 |
| 64 | 1000000 | 111 | 7 | 2.33 | |
| 128 | 10000000 | 1000 | 8 | 2 | |
| 256 | 100000000 | 1001 | 9 | 2.25 | |
| 512 | 1000000000 | 1010 | 10 | 2.5 | |
| 1024 | 10000000000 | 1011 | 11 | 2.75 | |
| 2048 | 100000000000 | 1100 | 12 | 3 | |
| 4096 | 1000000000000 | 1101 | 13 | 3.25 | |
| 8192 | 10000000000000 | 1110 | 14 | 3.5 | |
| 16384 | 100000000000000 | 1111 | 15 | 3.75 | |

The timing circuit of the invention achieves significant real-time data compression in the number of bits required to represent a number. A 4 bit storage device replaces a 13 bit storage device, giving a reduction in the RAM storage required by a for of more than 3,5 in the number of bits required to represent the delay.

Storage of the most significant bit of a delay time achieves significant real-time data compression in the values stored in counters relating rapid events in a pulse arrival distribution. The size, in terms of number of bits, of each counter may not be equal for each counter unit but selected to best suit the average pulse arrival probability distribution generated by the application. The outputs of each counter may be sent to an AND gate, and then these outputs sent to an OR gate, thereby generating an end of experiment signal when a first counter is filled. This pulse could be used to transfer a pulse arrival distribution PAD output to a buffer and restart a measurement. Thus, each measurement may be composed of many small sub-measurements. This may be of particular use where very high speed (hence low bit number) counters are required and/or where noise is present, the sub-experiments allowing averaging and discard of biased information.

The most significant bit compression as established above may be used in conjunction with compression for RAM storage. In FIG. 7, data output from the analogue to digital converter 61 is already compressed so the data, which may be binary, decimal or any other format, may be passed directly to RAM. A series of counters, replacing or in conjunction with the memory may then measure a pulse arrival distribution whilst carrying out most significant bit compression.

An example would be the numbers 1, 2, 3, 4, 5, 6, 7, which when output from the analogue to digital converter may represent delays of 1, 2, 7, 15, 31, 63, 127 time periods. Final counters may be used to apply Per compression to a pulse arrival distribution, giving time bins for 1, 2, 15, 127 time periods. This may be particularly useful as a highly compressed low bit number real-time pulse arrival distribution may be utilised to decide if 'correctable' data exists and thus if the stored data is worth analysing.

In certain applications (for example analogue fluorescence decay time measurements using a pulsed source) a data stream will not approximate to a random distribution, but rather will form blocks of highs and lows which tend to follow sequentially. In this case, the time between changes of state (i.e. low to high and high to low) may be measured. Measurement of this type may be referred to as change of state triggering, and is known in the art. It will be appreciated that the non-linear timing circuit according to the invention may be configured to provide timing data via change of state triggering. For example, an analogue signal may be digitised via a threshold level leading to digitisation levels which may be viewed as change of state information (e.g., see optional D/A converters shown in dotted boxes in FIG. 3). This information may then be measured using the non-linear timing circuit according to the invention. Whilst excitation may be pulsed where a plurality of pulses are generated by the single excitation and/or where the sample is re-excited at regular intervals and the excitation generates a data pulse itself then the data stream may be considered continuous.

The invention allows real-time analysis of signals up to GHz frequencies.

The invention is described in relation to the measurement of time between events. These events may be pulses of similar width or pulses of variable width. Alternatively, the invention could be used to measure the width of pulses or other events.

Whilst the invention describes the use of the circuits to measure time between events in a non-linear manner, it is noted that an alternative configuration of the invention could be arranged to count, in a non-linear manner, the number of events occurring within a given period.

The invention may be configured so that a first detected event acts as a trigger, which initiates storage of subsequent detected events. The events may be pulses emitted from a single source, or pulses emitted from two or more separate sources.

In many applications where analogue signals are measured, the invention may be used if the signals are digitised by reduction in the signal strength to ensure only single quanta are detected, and/or by use of a comparator. In other applications the circuit may operate alongside a Analog-to-Digital Converter (e.g., see dotted box options in FIG. 3) allowing pulse arrival time (or pulse width) and pulse height (or pulse area/gradient with the use of integration or differentiation circuit) to be measured.

Where the invention is used for real-time recordal of event distributions, a non-linear measurement of times between data will reduce the number of counts stored on counters used for the most rapid events. This is in effect an alternative form of data compression (as opposed to data compression through reduction of the number of bits required to represent an event stream). The compression of the number of counts in counters used for the most rapid events ensures that theses counters do not rapidly saturate (as opposed to compression in the number of data bits required to represent a number, which reduces a quantity of RAM required to store the number).

The invention shows methods of real-time coding/decoding between compression for the number of data bits, compression for pulse distribution and linear binary representation using Look Up Tables (LUT) or other equivalent logic circuits.

The invention may be of use in any field where a data stream must be analysed and the mean data rate per clock cycle is less than 0.5.

Use of an external trigger line to the first channel such that timing starts after a trigger pulse, or is enabled by a trigger pulse but not started, would allow the circuit's use in applications where a pulsed source is used. For example in time resolved flourimetry, if clock 0 is triggered by the falling edge of the source pulse, the following channels will detect the time between emitted fluorescence photons. When all channels have been triggered, the circuit is reset to the first channel in readiness for the next laser pulse.

A comparator may be used to terminate operation of the timing circuit. For example, in a single channel timing circuit measuring time resolved fluorescence, a clock could be triggered by a falling edge of an incident laser pulse, and stopped when detected fluorescence has fallen below a critical value pre-set at the comparator.

The circuit may be utilised as a high speed method of data logging.

Figure 8:
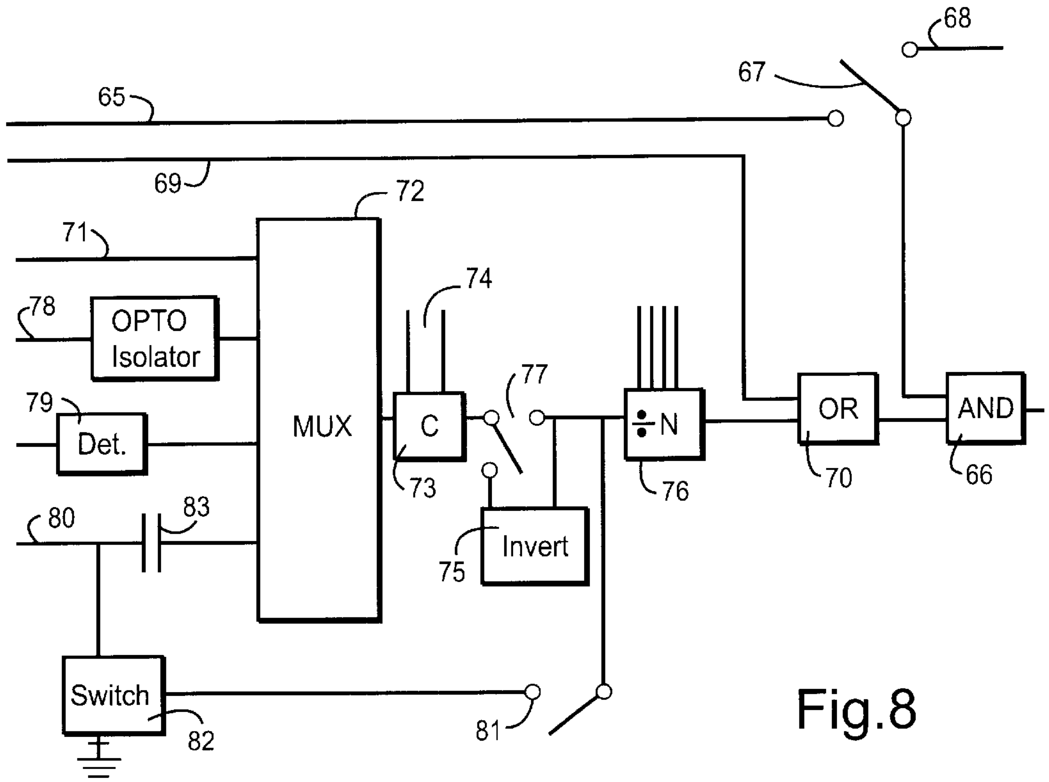
FIG. 8 is a schematic representation of a signal conditioning front end for a timing circuit according to the invention.

A signal conditioning front end for a timing circuit according to the invention is shown FIG. 8. The front end includes possible pre-processing functions for pulse generation prior to the non-linear part of the timing circuit. Six inputs shown, the top input 65 is a trigger enable; a signal on this port enables the AND gate 66 to allow a pulse output. This circuit may be short-circuited by connecting a switch 67 to an upper voltage line 68.

The next input 69 is a trigger input, a pulse on this line actions an OR gate 70 and generates a pulse provided that the enable input 65 is high or short-circuited.

A standard DC input 71 enters a multiplexer 72 and passes to a comparator 73 which may be twin level 74. The resulting pulse may be inverted by an inverter 75 or pass directly to a divide by N circuit 76 depending on switch position 77. The divide-by-N circuit 76 may be used to operate as a pre-scaler when required.

The multiplexer 72 may also have an isolated DC input in the form of an opto-isolator 78, or otherwise.

Where the signal and/or the detector is generated some distance from the circuit the signal may be transmitted optically by fibre or through free space if the circuit is fitted with a suitable optical detector 79.

A final input circuit 80 may be used in two manners, in its simplest form with switch 81 open it is an AC coupled input for digital pulses. When switch 81 is shut the input circuit 80 acts as a type of integrator allowing stable conversion to digital for low level analogue signals. When the input circuit 80 is activated a switch 82 changes from earthing the input side of a capacitor 83, to open circuit and the capacitor 83 charges. When the capacitor 83 has charged to the pre-set level, according to the comparator 73 value, the comparator 73 will generate a digital pulse which again earths the comparator via switch 82. Thus the input circuit 80 measures how much time is required by a signal to generate the charge necessary to produce the required comparator voltage.

The pre-processing functions described above may be used on circuits other than those described herein.

The front end shown in FIG. 8 could be produced on a single semiconductor substrate. The circuit may include active or passively quenched avalanche photodiodes, non-linear circuits, most significant bit or most significant bit compressed and memory compressed, counters, buffers and post processing circuits such as conventional hardwired correlators and/or Fourier transform circuits and/or digital filters. Resulting data may be analysed after de-compression or when compressed.

The logic circuits included in the described embodiments, whilst described only in electronic form, could be constructed using another medium such as light or as a computer simulation. Implementation using another logic medium i.e. light would allow much higher temporal resolution. Implementation using another logic medium would allow further integration for many applications, i.e. implementation using light may allow the source, required optics sample cell and the circuits described above to be implemented in/on a single substrate.

The non-linearity required may be generated by many methods and in many media, whilst being part of an electronic digital circuit A circuit may be configured such that a first detector pulse turns on a light emitting component which is directly coupled to a solid state detector. A build-up of the detector may be made non-linear with respect to time if the detector is used near saturation and/or the light emitting component has a non-linear warm-up. An array of detectors, for example a charge coupled device arrays may be used in this way.

Figure 10:
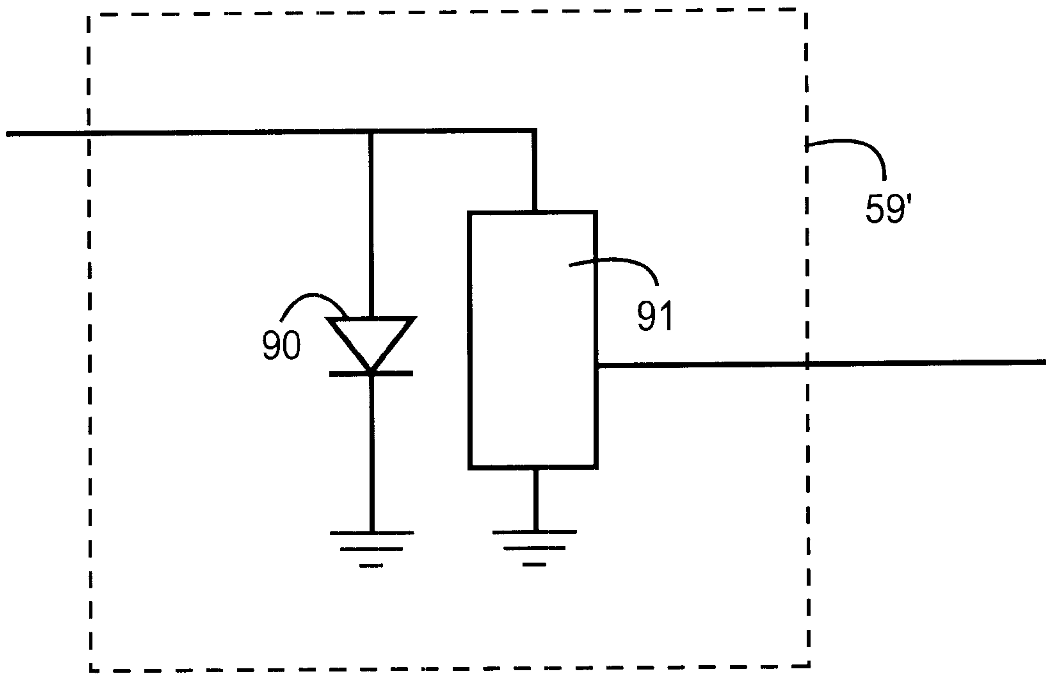
FIG. 10 shows a replacement optical circuit for the capacitor in FIG. 7.

Charge coupled device arrays may also be used to provide a further method of non-linear timing, due to the blooming and consequent leakage to surrounding detectors that they generate when saturated. A single CCD may have in excess of $10^6$ pixels, each pixel potentially being a separate non-linear clock, and the CCD thereby offers high channel number parallel processing. Light emitting components may be used to provide non-linear responses for circuits other than those described herein. As shown in FIG. 10, circuit block 59' includes light emitting component (LED) 90 and charge couple device (CCD) 91. The circuit block 59' replaces the capacitor 59 in FIG. 7.

High speed look-up tables are in significant use of image processing applications to provide false colour from intensity signals. This may be used to code the output of a non-linear clock into significant bit compression to represent a distribution of separation times between events or binary output, or to generate most significant bit compression directly from a linear clock.

Figure 9:
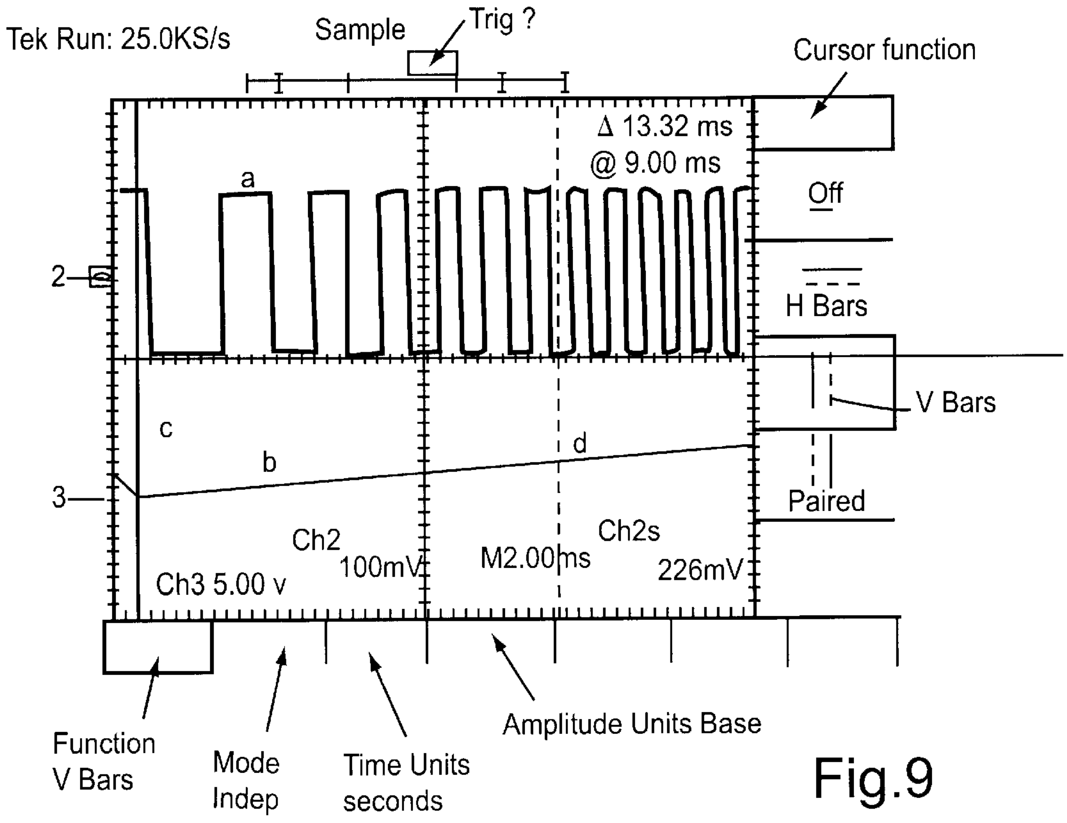
FIG. 9 is an output provided by a timing circuit according to the invention.

An ouput provided by a circuit according to the invention that was constructed from conventional hardware is shown in FIG. 9. Only a single channel was constructed. FIG. 9 shows au output from a oscilloscope (Tektronix TDS 744A) capturing data from a sweeping signal generator (Tektronix CFG280). The top trace (a) shows the signal output, the lower trace (b) the sweep control. After a pulse input (c) the sweep voltage begins to rise and thus the pulse spacing reduces. A second pulse (d) stops the counter. The timed interval of 13 ms is described by the series of only 7 of pulses whilst maintaining the high temporal resolution.

This implementation demonstrates that the rate of change of the timer need not be a geometric decrease, but may be any pre-selected function. The implementation shown in FIG. 9 has a linear increase in the temporal resolution.

Applications of the invention include image processing, pulsed light demon systems, time resolved fluorescence, time of flight studies, radar, data logging, and use in connection with dynamic light scattering, quasi-elastic light scaling, fibre-optic dynamic light scattering, fibre-optic dynamic anenometry, and laser Doppler experiments.

What is claimed is:

1. A timing circuit for recording the duration of intervals between a plurality of events in a data stream, said circuit comprising:

at least two timing channels, each channel being arranged to generate a signal representing time elapsed between events, wherein the rate of change of the signal occurrences generated by each timing channel varies with increasing interval duration, and wherein the timing channels include means for causing each event to terminate the operation of one timing channel and to initiate operation of another timing channel.

2. A timing circuit as in claim 1, wherein the timing channels are configured such that the rate of change of the signal occurrences decreases as a predetermined sequence.

3. A timing circuit as in claim 1 wherein the timing channels are configured such that the rate of change of the signal decreases as a substantially geometric series.

4. A timing circuit as in claim 1 wherein:

at least one of the timing channels comprises a source of clock pulses and a counter, and the signal comprises the clock pulses which are accumulated by the counter between events.

5. A timing circuit as in claim 4, wherein the timing channels each include an internal counter and a logic circuit, the logic circuit being programmed by the internal counter to cause an increment of the accumulated count in the first-mentioned counter when a predetermined number of cycles of a linear clock have occurred.

6. A timing circuit as in claim 1 wherein at least one of the timing channels comprises an analog clock.

7. A timing circuit as in claim 6, wherein the analog clock comprises a charge component which is alternately charged and discharged between events, the charge component exhibiting an intrinsic non-linear complex impedance.

8. A timing circuit as in claim 7, wherein the circuit further comprises:

an analog to digital converter for converting an analog signal at the charge component into a digital signal, and means for resetting the charge at said charge component upon the arrival of an event.

9. A timing circuit as in claim 7 wherein the charge component is an electronic component, which provides an output to a comparator comprising a voltage across or a charge accumulated in the charge component.

10. A timing circuit according to claim 7 wherein:

charging and discharging of the charge component is commenced from a non-zero initial value, the initial value being chosen to provide a required rate of change of charging and discharging.

11. A timing circuit as in claim 7 wherein said intrinsic non-linear complex impedance is selected by switching between combinations of charge components.

12. A timing circuit as in claim 7 wherein the charge component is a substantially capacitive circuit.

13. A timing circuit as in claim 7 wherein charging or discharging of the charge component is induced by optical excitation.

14. A timing circuit as in claim 13, wherein:

the charge component comprises one or more solid state optical detectors which provide a nonlinearity function, via overfilling of the one or more detectors.

15. A timing circuit as in wherein the circuit comprises:

a plurality of timing channels arranged to operate in a predetermined sequence, each event terminating the operation of one channel and initiating the operation of the next channel in the sequence.

16. A timing circuit as in claim 15, wherein:

the circuit is configured such that a detected event will cause the contents of the channel, the operation of which is terminated, to be transferred to a storage circuit while initiating the generation of a timing signal by the next channel.

17. A timing circuit as in claim 16, wherein:

a second storage circuit is used as a buffer to allow rapid data transfer from the channel to the first-mentioned storage circuit.

18. A timing circuit as in claim 17, wherein:

the second storage circuit is a first-in-first out buffer storage circuit.

19. A timing circuit as in claim 1, wherein the circuit further comprises:

two detectors for detecting events in the data stream, the detectors being arranged such that an event incident at a first detector will terminate the operation of a first timing channel and initiate the operation of a second timing channel, and a subsequent event incident at a second detector will terminate the operation of the second timing channel and initiate the operation of the first timing channel or a third timing channel.

20. A timing circuit as in claim 19, wherein the two detectors for detecting events in the data stream have different characteristic noise signatures such that cross-correlation of the detectors produces a characteristic noise signature significantly below that of the auto-correlation of either detector.

21. A timing circuit as in claim 20, wherein the two detectors are based upon different physical detection phenomena, such that any similarity in the characteristic noise signatures of the detectors is minimised.

22. A timing circuit as in claim 21, wherein the two detectors comprise a photon multiplier tube and a solid state detector.

23. A timing circuit as in claim 22, wherein:

a temperature of the solid state detector is modified independently of the temperature of the photon multiplier tube, to modify the characteristic noise signature of the solid state detector, and thereby enhance the difference between the characteristic noise signature of the solid state detector and the characteristic noise signature of the photon multiplier tube.

24. A timing circuit as in claim 1, wherein:

the circuit is provided with means for obtaining a measurement comprising a correlation of an emission signal distribution with a distribution of detected events induced from a sample by an excitation.

25. A timing circuit as in claim 24, wherein the correlation is carried out in real-time.

26. A timing circuit as in claim 1, wherein an analog to digital converter is combined with the circuit to allow properties of events to be converted into a digital form and stored in combination with the time interval between events.

27. A timing circuit as in claim 1 wherein:

the circuit is configured to measure time duration of pulses as said events, an initial portion of a rising edge of a pulse being treated as a first event, and a final portion of a falling edge of the pulse being treated as a second event.

28. A timing circuit as in claim 1, wherein:

at least one timing channel includes input means to convert a characteristic of one or more of said events represented by a pulse such as the pulse area, height or gradient into a pulse spacing or pulse width such that the timing circuit may be used to record the characteristic.

29. A timing circuit as in claim 1, wherein:

at least one timing channel includes input means for inverting a detected input event signal to facilitate the measurement of pulse widths.

30. A timing circuit as in claim 1 wherein:

the circuit is configured to measure the number of events occurring within a specific time rather than the elapsed time between events.

31. A timing circuit as in claim 1, wherein:

a trigger from an external source is arranged to initiate operation of the circuit.

32. A timing circuit as in claim 1, wherein a trigger from an external source is arranged to enable, although not initiate, operation of the circuit.

33. A timing circuit as in claim 1, wherein:

at least one of the timing channels comprises a linear clock connected via an internal counter to an input of a multiplexer, the multiplexer having outputs connected to a series of accumulators only one of which is incremented as a result of a monitored interval, the interval time required to cause incrementation of a second accumulator of any successive pair of accumulators being greater than the interval required to cause incrementation of the first accumulator of the pair.

34. A timing circuit as in claim 33, wherein the internal counter comprises a cascade of counters.

35. A timing circuit as in claim 1 wherein:

an event comprises the accumulation of charge from a detector until the charge is greater than a predetermined level, whereupon the operation of one timing channel is terminated and the operation of another timing channel is initiated.

36. A timing circuit for recording the duration of time intervals between a plurality of event signals, said circuit comprising:

means for initiating and terminating successive timing periods in response to the successive occurrences of event signals, and means for accumulating separate respectively corresponding non-linear measurements of time elapsed during said successive timing periods.

37. A method for recording the duration of time intervals between a plurality of event signals, said method comprising:

initiating and terminating successive timing periods in response to the successive occurrences of event signals; and accumulating separate respectively corresponding non-linear measurements of time elapsed during said successive timing periods.

38. A method as in claim 37, wherein:

said event signals comprise pulses and a characteristic of a pulse such as area, height or gradient is converted into a pulse spacing or pulse width and recorded.

39. A method for recording the duration of intervals between a plurality of events in a data stream, said method comprising:

generating successive signals representing time elapsed during the interval between respectively corresponding successively occurring events, wherein the rate of the generated signal occurrences during each period varies with increasing interval duration, and separately accumulating a count of said generated signal occurrences during respectively corresponding successive intervals.

40. A method as in claim 39, wherein the rate of change of the signal occurrences decreases as a predetermined sequence.

41. A method as in claim 39 wherein the rate of change of the signal decreases as a substantially geometric series.

42. A method as in claim 39 wherein:

the generated signal comprises clock pulses which are accumulated by a counter between events.

43. A method as in claim 42 wherein the rate of increase of the accumulated count is determined by an internal counter and a logic circuit, the logic circuit being programmed by the internal counter to cause an increment of the accumulated count when a predetermined number of cycles of a linear clock have occurred.

44. A method as in claim 39, wherein the generated signal is controlled by an analog clock comprising a charge component which is alternately charged and discharged between events, the charge component exhibiting an intrinsic non-linear complex impedance.

45. A method as in claim 44 wherein:

an analog signal at the charge component is converted into a digital signal, and the charge at said charge component is reset upon the arrival of an event.

46. A method as in claim 39 wherein:

a plurality of timing channels operate in a predetermined sequence, each event terminating the operation of one channel and initiating the operation of the next channel in the sequence.

47. A method as in claim 46 wherein:

a detected event causes the contents of the channel, the operation of which is terminated, to be transferred to a storage circuit, while initiating the generation of a timing signal by the next channel.

48. A method as in claim 46 wherein:

two detectors are used for detecting events in the data stream, an event incident at a first detector terminates the operation of a first timing channel and initiates the operation of a second timing channel, and a subsequent event incident at a second detector terminates the operation of the second timing channel and initiates the operation of the first timing channel or a third timing channel.

49. A method as in claim 48, wherein the two detectors for detecting events in the data stream have different characteristic noise signatures such that cross-correlation of the detectors produces a characteristic noise signature significantly below that of the auto-correlation of either detector.

50. A method as in claim 39, wherein:

a correlation is provided of an emission signal distribution with a distribution of detected events induced from a sample by an excitation.

51. A method as in claim 50, wherein the correlation is carried out in real-time.

52. A method as in claim 39, wherein properties of events are converted into a digital form and stored in combination with the time interval between events.

53. A method as in claim 39, wherein:

the events comprise pulses and a time duration of these pulses is measured, an initial portion of a rising edge of a pulse being treated as a first event, and a final portion of a falling edge of the pulse being treated as a second event.

54. A method as in claim 39, wherein:

a linear clock is connected via an internal counter to an input of a multiplexer, the multiplexer having outputs connected to a series of accumulators only one of which is incremented as a result of a monitored interval, the interval time required to cause incrementation of a second accumulator of any successive pair of accumulators being greater than the interval required to cause incrementation of the first accumulator of the pair.

55. A method as in claim 46, wherein:

an event comprises the accumulation of charge from a detector until the charge is greater than a predetermined level, whereupon the operation of one timing channel is terminated and the operation of another timing channel is initiated.

* * * * *